Jan. 27, 1925.
O. L. GILLILAND
1,524,298
TRACTOR TREAD CHAIN
Filed Jan. 7, 1922
3 Sheets-Sheet 1
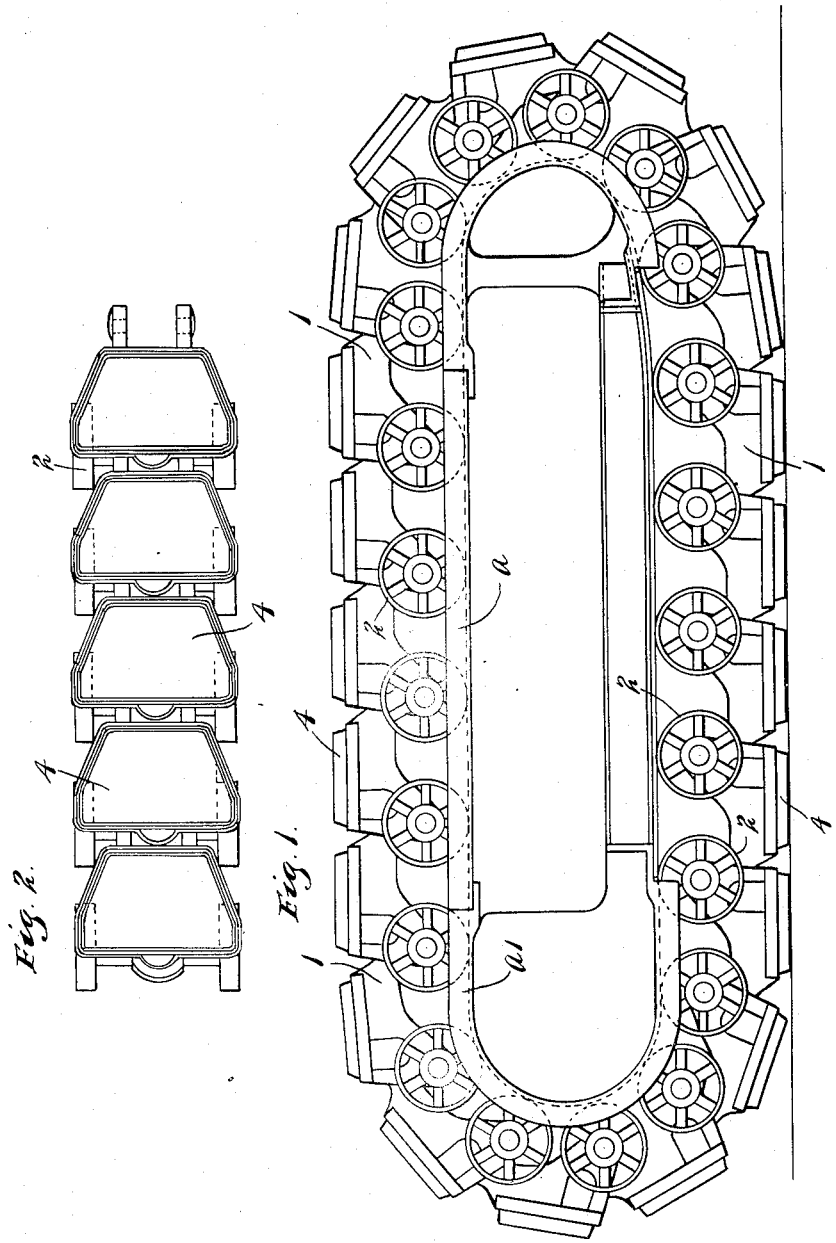
INVENTOR
O.L. GILLILAND.
BY HIS ATTORNEY.

Jan. 27, 1925.　　　　　　　　　　　　　　　　　　　1,524,298
O. L. GILLILAND
TRACTOR TREAD CHAIN
Filed Jan. 7, 1922　　　　　3 Sheets-Sheet 2

INVENTOR.
O. L. GILLILAND
HIS ATTORNEY.

Jan. 27, 1925.
O. L. GILLILAND
1,524,298
TRACTOR TREAD CHAIN
Filed Jan. 7, 1922
3 Sheets-Sheet 3
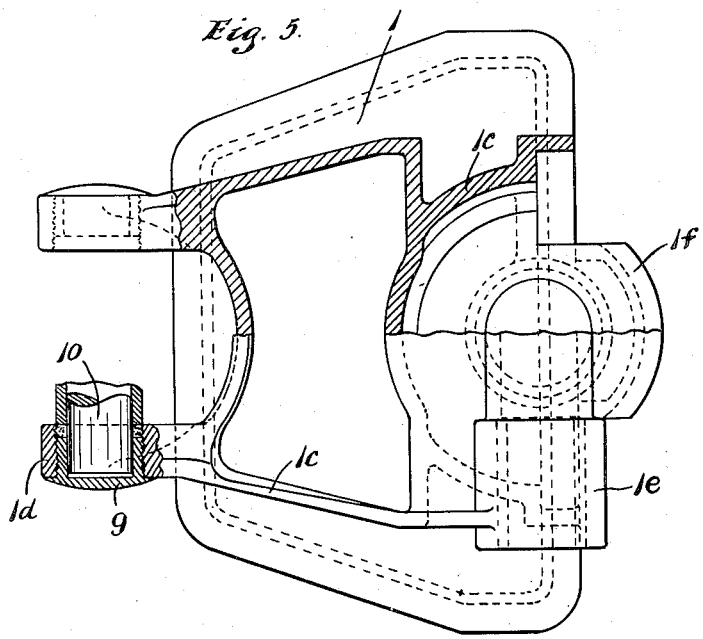
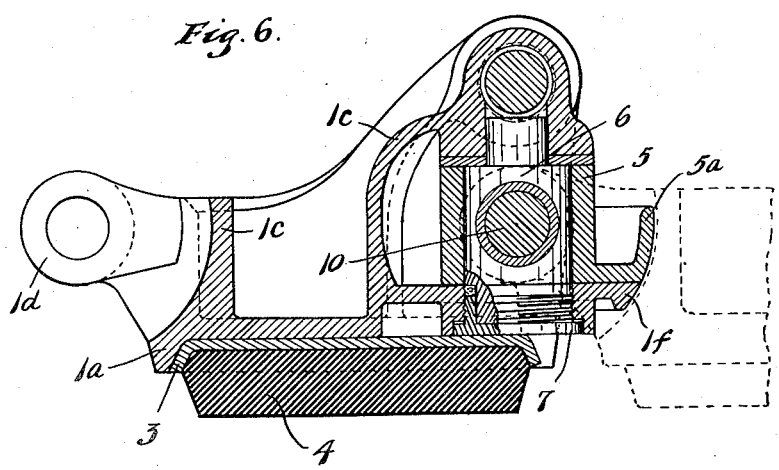

Patented Jan. 27, 1925.

1,524,298

UNITED STATES PATENT OFFICE.

ORRA L. GILLILAND, OF MINNEAPOLIS, MINNESOTA.

TRACTOR TREAD CHAIN.

Application filed January 7, 1922. Serial No. 527,658.

*To all whom it may concern:*

Be it known that I, ORRA L. GILLILAND, a citizen of the United States, residing at Minneapolis, in the county of Hennepin and State of Minnesota, have invented certain new and useful Improvements in Tractor Tread Chains; and I do hereby declare the following to be a full, clear, and exact description of the invention, such as will enable others skilled in the art to which it appertains to make and use the same.

This invention relates to a tractor, and particularly to a tread chain or belt for a tractor of the endless track type.

It is an object of this invention to provide a tread chain composed of links connected by blocks mounted on rigid, vertical and horizontal pivot members, said links having rollers mounted on their upper sides in engagement with a guiding track.

It is a further object of the invention to provide a dust proof structure for the pivot members of said block which connects the links.
It is still another object of the invention to provide the links with flanges to which are secured plates carrying rubber tread blocks.

This invention is an improvement upon the tread chain disclosed in my co-pending application filed June 25th, 1920, S. N. 391,724, and claimed in my co-pending application filed Nov. 12th, 1921, S. N. 514,618, which is a division of said first identified application.

The above and other objects and advantages of the present invention will be fully set forth in the following description made in connection with the accompanying drawings in which like reference characters refer to the same parts throughout the different views, and in which, Fig. 1 is a side view of the chain showing certain parts of a tractor to which it is to be applied;

Fig. 2 is a partial plan view of the chain shown in Fig. 1;

Fig. 5 is partially a plan view and partially a sectional view of one of the links showing also a portion of the pivot connection; and Fig. 6 is a vertical section taken substantially on the line 6—6 of Fig. 3.

Figure 3:
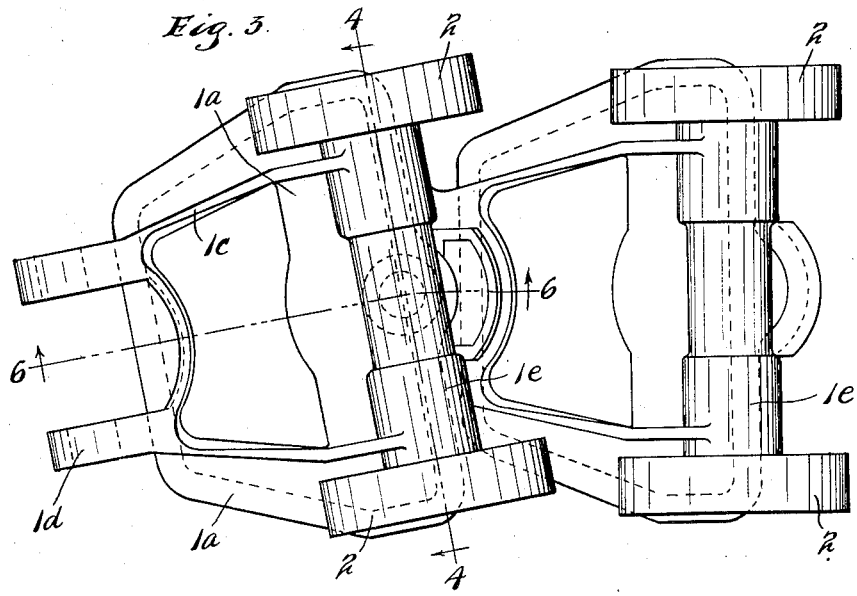
Fig. 3 is a plan view of a pair of links connected, shown on an enlarged scale;
Figure 4:
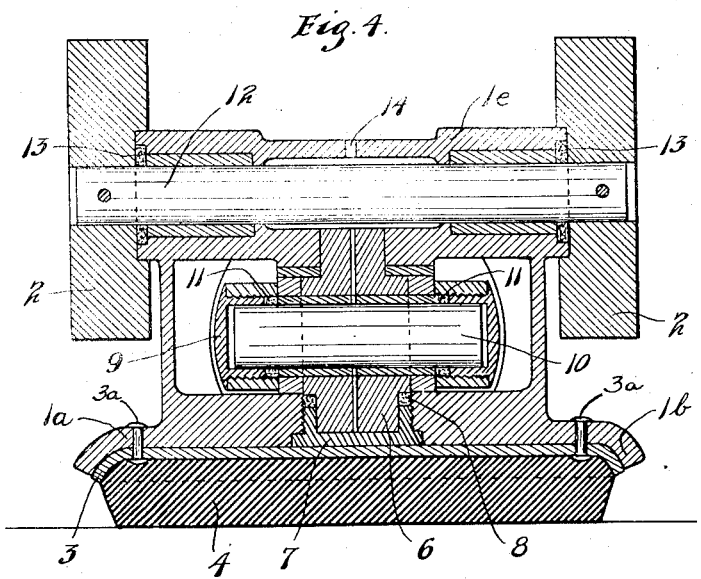
Fig. 4 is a vertical section taken on the line 4—4 of Fig. 3.

Referring to the drawings, the chain comprises a series of connected links 1 equipped with rollers 2, which rollers are adapted to run on a guiding track $a$ of the tractor frame. As disclosed in applicant's co-pending application above identified, one end $a^1$ of this frame constitutes a semi-circular yoke which is mounted to swing laterally for the purpose of guiding the tractor.

The links 1, each comprises a main body portion $1^a$ around the lower portion of which, at the sides and front, extends a flange $1^b$. A plate 3 is secured to this flange by spaced rivets $3^a$, which rivets pass through plates 3 and secure the same to said flange. The plates 3 are also provided with downwardly extending flanges and have secured therein tread blocks 4 of rubber or similar material. A web $1^c$ rises from the flange $1^b$ and spaced ears $1^d$ project from the forward portion thereof, which ears are interiorly threaded and alined on an axis which is normal to the longitudinal axis of the link. At its rear portion, the web $1^c$ merges into a transversely extending hub $1^e$ at the rear of the link, which hub is located at the top portion thereof. Below the hub $1^e$, the web $1^c$ at the rear of the link extends vertically downward, as shown in Fig. 5 and immediately forward of this portion the said web is of substantially semi-circular form in plan. At the lower portion of said link, a step flange $1^f$ projects from said flange having an independent interiorly threaded hub with an enlarged shouldered bore at its lower portion.

A block 5 is used to connect the links of the chain and said block has a rearwardly extended portion $5^a$ formed substantially upon the arc of a circle in plan, the exterior surface of which is of partial spherical shape and adapted to swing in close proximity to the front portion of the link 1 between the ears $1^d$. The block 5 has rigidly fitted therein and forming a part thereof a post 6 having journal portions at its top and bottom sides. The block 5 thus provides a wide bearing surface with the flange $1^f$ and said block and flange afford one part of the semi-spherical bearing between said links. The post 6 and block 5 are made separate for convenience. The link 1 is provided with a bore directly under the hub $1^e$ and centrally thereof to receive the top journal of the post, and the lower journal of the post is received in a threaded bearing 7 having a flanged head, said bearing being screwed into the hub depending from flange 1$^f$, the head thereof being received in the enlarged bore in the end of said hub. A dust proof washer 8 of felt or similar material is disposed between the end of member 7 and the post 6 and forms a dust proof bearing for the lower journal of said post. The block 5 is thus connected to link 1 by a rigid pivot member and a washer of suitable antifriction material is inserted between the top of block 5 and bearing 7 and the contacting surface of link 1. The ears 1$^d$ of one link are adapted to fit into the rear portion of the adjacent link and these ears receive flanged headed screws 9 bored to furnish bearings for the transverse pin 10 which passes through suitable bushings fitted in the post 6 of block 5. The screws 9 are threaded into the hubs 1$^d$ and washers of felt or similar material 11 are fitted about the pin 10 between the ends of block 5 or the bushings therein and the ends of screws 9, and form dust proof bearings for the ends of pin 10. The hub members 1$^e$ at each side of the link are bored to receive suitable bushings driven therein, and a shaft 12 is journaled in said bushings and has pinned to each end thereof the roller members 2, these roller members being provided with lateral recesses at the inner sides fitting over the ends of the hubs 1$^e$. A recess is formed in the ends of hubs and washers 13 of felt or similar material are disposed in these recesses about the shaft 12 and contact with the ends of said recesses, the ends of the bushings in said hubs and the sides of the rollers 2 and thus form a dust proof bearing for the shaft 12. The link 1 is cored between the bearings in hub 1$^e$ to form a cavity larger than shaft 12 and an oiling aperture 14 is formed in the top of the link and communicates with the cored opening about the shaft 12. The post 6 also has an oil opening extending vertically therethrough and oil is thus supplied to the bearing portions of the pin 10 and the lower portion of post 6. The upper journal on the post 6 will be oiled from the cavity in the hub 1$^e$.

The link structure described is operatively related to the rubber tread blocks. As the chain is swung laterally for guiding purposes the block last laid on the ground will be held thereby and act to control the next link which must swing about its connection to the link carrying said block. There is thus no twisting movement of the tread blocks against the ground with the resulting wear. The blocks once laid on the ground remain stationary until picked up at the rear of the tractor. There is thus a combinative relation between the tread blocks and other link structure. The chain will align itself quickly with any guiding member and can be laid on the ground in curves without any tendency to twist about its longitudinal axis.

These rubber tread blocks are used on trailing trucks or on trucks which carry a load, but in hauling or pulling tractors the rubber blocks are usually replaced by steel traction lugs.

From the above description, it will be seen that applicant has provided a compact and efficient tractor chain, the links of which are connected by rigid vertical and horizontal pivot members so arranged that the same can be efficiently lubricated, the bearing portions of said pivot members being housed in dust proof structures. The chain comprises comparatively few parts which are easily made and which can be quickly assembled. When once assembled, the parts require practically no attention for maintenance or repair.

It will, of course, be understood that various changes may be made in the form, details and proportions of the parts without departing from the scope of applicant's invention, which, generally stated, consists in the matter shown and described and set forth in the appended claims.

What is claimed is:

1. A tractor belt for tractors comprising connected links, each having at one end a pair of spaced ears alined on a transverse axis, a block pivoted on a vertical axis to the opposite end of the adjacent link and pivotally mounted on a transverse pin carried in said ears and extending therebetween, dust excluding washers of yielding fabric material surrounding said pin disposed in said ears and bearing against each side of said block, said ears being threaded and having flanged solid headed screws therein forming bearings for the ends of said pin, said screws having their inner ends in engagement with said washers whereby a dust proof structure is provided in the bearing portions of said pin.

2. A tractor belt for tractors comprising, connected links, adjacent links being connected by a block pivoted thereto by rigid horizontal and vertical pivot members, said vertical pivot members extending from the top and bottom of said block, each of said links having a flange extending from one end thereof on which said block is supported, said flange having a depending hub interiorly threaded, a flanged headed screw secured in said hub and closing the bottom thereof, said screw being hollow and receiving the pivot member at the bottom of said block, and a washer of yielding fabric material disposed about said last mentioned pivot member and contacting said block and also contacted by the inner end of said flanged headed screw.

3. A tractor belt for tractors comprising links, each having a pair of laterally spaced ears alined on an axis normal to the longitudinal axis of the link, a block pivoted on a pin journaled in said ears, said block having pivoted journals rigid therewith at its top and bottom, the said links having vertically alined bores in the ends opposite the ends having the said ears, which bores are adapted to receive the journals of said blocks, each link also having a transverse hub above and parallel to the axis of said pin, and a shaft journaled therein having rollers secured at each end thereof, said rollers being adapted to bear on a track.

4. A tractor belt for tractors comprising links, each having a pair of laterally spaced and apertured ears alined on an axis normal to the longitudinal axis of the link and having a partly spherical surface between said ears, a block pivoted on a pin supported in said ears, said block having pivot journals rigid therewith at its top and bottom, and said links having vertically alined bores in the ends opposite the ends having the said ears, which bores are adapted to receive the journals of said block, said block having a partly spherical surface moving in close proximity to said partly spherical surface on said link and said journals having a common axis which intersects the axis of said pin.

5. The structure set forth in claim 4, said links having a substantially horizontal flange supporting said block, which flange has a partly spherical surface continuous with the partly spherical surface of said block.

6. A tractor belt for tractors comprising links, each having a pair of laterally spaced ears alined on an axis normal to the longitudinal axis of the link, bushings threaded into said ears from the outer sides having solid heads with continuous outer surfaces, said heads contacting and closing said sides, said bushings terminating short of the inner side of said ears, a pin journaled in said bushings and extending between said ears, a block pivoted on said pin and contacting the inner side of said ears and yielding washers of fabric material disposed in said ears and pressed against said block by said bushings.

7. A tractor belt for tractors comprising connected links, each having at one end a pair of laterally spaced and apertured ears alined on a transverse axis, bushings threaded into and closing the outer sides of said ears, a pin journaled in said bushings, a block journaled on said pin, the adjacent link having a flange supporting said block and having hubs alined on a transverse axis disposed above said block, said hubs having a vertical aperture centrally thereof and said flange having a vertical aperture alined with said first mentioned aperture, said block having top and bottom journals disposed, respectively, in said apertures.

8. The structure set forth in claim 7, a bushing threaded into said flange from the bottom thereof and bored to receive said bottom journal of said block, a yielding fabric washer in said flange surrounding said journal and pressed against said block by said bushing, and a plate secured to the bottom of said flange against said bushing and adapted to have a rubber thread block secured thereto.

9. A tractor belt for tractors comprising connected links, which links have a pair of spaced alined ears at one end, a pin journaled in and extending between said ears, a block journaled on said pin between said ears, journals at the top and bottom of said block, the adjacent link having vertically spaced bored portions receiving said journals, the axes of said journals and pin intersecting at right angles.

In testimony whereof I affix my signature.

ORRA L. GILLILAND.